United States Patent
Takamori

(10) Patent No.: US 12,480,023 B2
(45) Date of Patent: Nov. 25, 2025

(54) HOT-MELT ADHESIVE

(71) Applicant: HENKEL AG & CO.KGAA, Duesseldorf (DE)

(72) Inventor: Ai Takamori, Osaka (JP)

(73) Assignee: HENKEL AG & CO. KGaA, Duesseldorf (DE)

( * ) Notice: Subject to any disclaimer, the term of this patent is extended or adjusted under 35 U.S.C. 154(b) by 606 days.

(21) Appl. No.: 17/340,336

(22) Filed: Jun. 7, 2021

(65) Prior Publication Data

US 2021/0292605 A1    Sep. 23, 2021

Related U.S. Application Data

(63) Continuation of application No. PCT/JP2019/048070, filed on Dec. 9, 2019.

(30) Foreign Application Priority Data

Dec. 13, 2018  (JP) ................ 2018-233576

(51) Int. Cl.
| | |
|---|---|
| C09J 7/35 | (2018.01) |
| C08K 5/01 | (2006.01) |
| C08L 23/0807 | (2025.01) |
| C08L 23/0853 | (2025.01) |
| C08L 23/16 | (2006.01) |
| C08L 91/06 | (2006.01) |

(52) U.S. Cl.
CPC ............ C09J 7/35 (2018.01); C08K 5/01 (2013.01); C08L 23/0815 (2013.01); C08L 23/0853 (2013.01); C08L 23/16 (2013.01); C08L 91/06 (2013.01); C08L 2201/08 (2013.01); C08L 2205/025 (2013.01); C08L 2205/035 (2013.01); C08L 2314/06 (2013.01); C09J 2301/304 (2020.08); C09J 2301/414 (2020.08); C09J 2423/04 (2013.01); C09J 2423/10 (2013.01); C09J 2423/16 (2013.01); C09J 2491/00 (2013.01)

(58) Field of Classification Search
CPC .... C09J 7/35; C09J 123/0815; C09J 2423/16; C09J 2423/04; C09J 2491/00; C09J 2301/414; C08L 23/0815; C08L 23/0853; C08L 23/16; C08L 2201/08; C08L 2205/025; C08L 2205/035; C08L 2205/03
See application file for complete search history.

(56) References Cited

U.S. PATENT DOCUMENTS

| | | | |
|---|---|---|---|
| 8,877,856 B2 * | 11/2014 | Yasui | ............ C09J 131/04 525/240 |
| 2013/0345355 A1 | 12/2013 | Takamori | |
| 2014/0199545 A1 | 7/2014 | Moriguchi et al. | |
| 2018/0334597 A1 | 11/2018 | Eichler-Johnson et al. | |

FOREIGN PATENT DOCUMENTS

| | | |
|---|---|---|
| CN | 103391982 A | 11/2013 |
| CN | 103797081 A | 5/2014 |
| EP | 3029101 B1 | 2/2017 |
| JP | 2008-527067 A | 7/2008 |
| JP | 2012-177009 A | 9/2012 |
| JP | 2015145504 A | 8/2015 |
| JP | 2016155916 A | 9/2016 |
| WO | 2006082478 A2 | 8/2006 |
| WO | 2012115279 A1 | 8/2012 |
| WO | 2016089851 A1 | 6/2016 |
| WO | 2017081632 A1 | 5/2017 |
| WO | WO-2018217748 A1 * | 11/2018 ........ C09J 123/0815 |

* cited by examiner

*Primary Examiner* — Scott R. Walshon
(74) *Attorney, Agent, or Firm* — Sun Hee Thomas

(57) ABSTRACT

A hot-melt adhesive having reduced thread formation at the time of applying, excellent thermal resistance and thermal stability after bonding. A hot-melt adhesive comprising a copolymer of ethylene and olefins having 3 to 20 carbon atoms (A), a copolymer of ethylene and carboxylate esters having ethylenically unsaturated double bonds (B), a tackifying resin (C) and a wax (D), wherein the copolymer of ethylene and at least one olefin monomer having 3 to 20 carbon atoms (A) comprises a metallocene-type propylene/ethylene copolymer (A1).

14 Claims, No Drawings

HOT-MELT ADHESIVE

TECHNICAL FIELD

The present invention relates to a hot-melt adhesive, and a product produced using the hot-melt adhesive.

BACKGROUND ART

A hot-melt adhesive is an adhesive not containing solvent, it is heated, melted and applied to an adherend, and then, solidified by being cooled to develop adhesiveness. Therefore, the hot-melt adhesive has features of enabling instant bonding and high-speed bonding (high-speed setting, and is used in a wide variety of fields such as paper processing, woodworking, sanitary material and electronic fields.

As a base polymer of the hot-melt adhesive, there have generally been used, according to the intended use, for example, ethylene-based copolymers such as an ethylene-vinyl acetate copolymer (hereinafter also referred to as "EVA") and an ethylene-ethyl acrylate copolymer (hereinafter also referred to as "EEA"); olefin-based resins such as polyethylene, polypropylene and amorphous poly-α-olefins (hereinafter also referred to as "APAO"); synthetic rubbers such as a styrene-based block copolymer (for example, a styrene-isoprene-styrene-based block copolymer (hereinafter also referred to as "SIS"), a styrene-butadiene-styrene-based block copolymer (hereinafter also referred to as "SBS") and a hydrogenated product thereof; polyurethanes; and the like.

Among these hot-melt adhesives, a hot-melt adhesive using ethylene-based copolymers as a base polymer is often used in the paper processing fields such as bookbinding and packaging, and the woodworking fields, as disclosed in JP 2012-177009 A and JP 2008-527067 A.

When coating a hot-melt adhesive, a specific coating device called a hot-melt applicator is often used. The hot-melt applicator has a nozzle which is a discharge port, and the hot-melt adhesive is heated to about 120 to 190° C., and discharged from a tip of the nozzle to be coated to the adherend.

When applying the ethylene-based hot-melt adhesive, a tread-form material of the hot-melt adhesive may be produced in the course of reaching the adherend from the tip of the nozzle. This tread-form material is due to the thread forming properties of hot-melt adhesive, and it smears around the periphery of nozzle or the areas of adherend not intended to be bonded. Therefore, it is important duty for adhesive manufacturers to develop a hot-melt adhesive with reduced thread forming properties and good application properties.

For example, a hot-melt adhesive of JP 2012-177009 A contains an ethylene and at least one olefin monomer having 3 to 20 carbon atoms copolymer and an ethylene/carboxylate ester copolymer are contained in a specific ratio, to reduce the thread formation when the hot-melt adhesive is jetted from a hot-melt gun ([claim 1], [Table 1] to [Table 2]).

Although the hot-melt adhesive of JP 2012-177009 A has reduced thread formation at the time of applying, there is still room for improvement in thermal resistance after bonding and adhesiveness at high temperatures. For example, when a cardboard box bonded with the hot-melt adhesive of JP 2012-177009 A is stored in a warehouse in summer, the adhesive strength of the adhesive may be reduced when the storage temperature increases, and the cardboard box can be open.

A hot-melt adhesive of JP 2008-527067 A contains an ethylene/C3-C20 α-olefin copolymer, an ethylene/(meth)acrylate ester copolymer and a tackifying resin in a specific ratio, to reduce thread forming properties ([Claim 1], [Table 1]). However, the hot-melt adhesive of JP 2008-527067 A is also insufficient with respect to thermal resistance and thermal stability.

SUMMARY OF INVENTION

The present invention solves the above conventional problems, and an object thereof is to provide a hot-melt adhesive having reduced thread formation at the time of applying, excellent thermal resistance and thermal stability after bonding.

DETAILED DESCRIPTION OF THE INVENTION

The present invention provides a hot-melt adhesive comprising a copolymer of ethylene and at least one olefin monomer having 3 to 20 carbon atoms (A), a copolymer of ethylene and carboxylate esters having ethylenically unsaturated double bonds (B), a tackifying resin (C) and a wax (D), wherein the copolymer of ethylene and at least one olefin monomer having 3 to 20 carbon atoms (A) comprises a metallocene-type propylene/ethylene copolymer (A1).

In one embodiment, the copolymer of ethylene and at least one olefin monomer having 3 to 20 carbon atoms (A) further comprises a metallocene-type ethylene/octene copolymer (A2).

In one embodiment, the ethylene-carboxylate ester copolymer (B) comprises an ethylene/vinyl acetate copolymer (B1).

In one embodiment, 5 to 40 parts by weight of (A1) is contained, based on 100 parts by weight in total of (A) to (D).

In one embodiment, 10 to 40 parts by weight of (A2) is further contained, based on 100 parts by weight in total of (A) to (D).

The present invention also provides a paper product comprising adhesion portions in paper that is an adherend, and any one of the above hot-melt adhesives which is bonded and solidified at the plurality of adhesion portions.

Effects of Invention

According to the present invention, a hot-melt adhesive is provided, which has excellent low temperature application properties and high-speed setting properties, and exhibits excellent adhesiveness in a wide temperature range from low temperature to high temperature. For example, a paper product produced using the hot-melt adhesive of the present invention exhibits excellent thermal resistance.

In the paper product of the present invention, there is no tread-form hot-melt adhesive fallen and adhere to the areas of adherend not intended to be applied. Since the adhesion portions have excellent thermal resistance and have excellent adhesive strength in a wide temperature range, the paper product of the present invention may also be stored in a freezer. It may also be left to stand in a warehouse in summer after having been stored in the freezer. The paper product of the present invention includes a cardboard packaging container for packing beverages such as beer, and a paper product comprising a paper board such as a carton.

The paper board means so-called cardboard paper, and refers to a generic term for thick paper made from wood pulp, used paper and the like (JIS P 0001 4001). A cardboard is a sheet in which a paper board liner is laminated on one side or both sides of a paper board serving as an inner core formed in a corrugated shape. The paper board used for the liner includes kraft liner (K liner) made from kraft pulp and used paper, jute liner (C liner) made from used paper and the like. A typical example of the cardboard includes an exterior cardboard described in JIS 1516.

DESCRIPTION OF EMBODIMENTS

A hot-melt adhesive of the present invention includes as essential components a copolymer of ethylene and at least one olefin monomer having 3 to 20 carbon atoms (A) (hereinafter sometimes referred to as a "copolymer (A)"), a copolymer of ethylene and carboxylate esters having ethylenically unsaturated double bonds (B) (hereinafter sometimes referred to as a "copolymer (B)"), a tackifying resin (C) and a wax (D).

In the present specification, the "hot-melt adhesive" refers to an adhesive, which is solid at normal temperature, but has fluidity by being heated and melted, may be applied to an object such as a substrate or an adherend, is cured by being cooled and adheres thereto.

<Copolymer (A)>

In the copolymer (A), examples of the olefin monomer having 3 to 20 carbon atoms" specifically include propylene, 1-butene, 1-pentene, 1-hexene, 1-heptene, 1-octene, 1-nonene, 1-decene, cis-2-butene, trans-2-butene, isobutylene, cis-2-pentene, trans-2-pentene, 3-methyl-1-butene, 2-methyl-2-butene, 2,3-dimethyl-2-butene and the like. Olefins having 3 to 10 carbon atoms is preferred, and propylene, butene, and octene are more preferred.

Examples of the copolymer (A) specifically include an ethylene/octene copolymer, an ethylene/butene copolymer, an ethylene/hexene copolymer, a propylene/ethylene copolymer, a propylene/1-butene copolymer, a ternary copolymer of propylene/ethylene/1-butene, a ternary copolymer of propylene/1-hexene/1-octene, and a ternary copolymer of propylene/1-hexene/methylpentene. These copolymers may be used alone or two or more may be mixed.

The copolymer (A) includes a metallocene-type propylene/ethylene copolymer (A1). The metallocene-type propylene/ethylene copolymer (A1) is a polymer produced by polymerizing ethylene and propylene using a metallocene catalyst. The polymer produced using the metallocene catalyst has a very narrow molecular weight distribution and does not cause deviation in crystallinity. The metallocene-type propylene/ethylene copolymer is uniform in the arrangement of ethylene moieties and propylene moieties, the content ratio of each structural unit, and the like, and therefore, a low molecular weight compound hardly occurs. As a result, it is considered that the hot-melt adhesive of the present invention is excellent in thermal resistance and exhibits excellent adhesive force in a high temperature environment.

The melting point of the metallocene-type propylene/ethylene copolymer (A1) is preferably 90° C. to 140° C. The ethylene content of the metallocene-type propylene/ethylene copolymer (A1) is preferably 5.5 to 10.0 wt %, particularly preferably 6.0 to 9.0 wt %, and most desirably 7.0 to 8.0 wt %.

The melting point and ethylene content of the metallocene-type propylene/ethylene copolymer (A1) in the above ranges improve adhesiveness of the hot-melt adhesive of the present invention in a wide temperature range from low temperature to high temperature. In addition, in this specification, the ethylene content is a ratio of ethylene structures with respect to the total weight of ethylene/α-olefin copolymers, and is taken as a value measured by the Exxon Mobil method based on ASTM method.

The copolymer (A) preferably further includes a metallocene-type ethylene/octene copolymer (A2). The metallocene-type ethylene/octene copolymer is a polymer produced by polymerizing ethylene and octene using a metallocene catalyst.

By including the metallocene-type ethylene/octene copolymer (A2) in the hot-melt adhesive of the present invention, adhesiveness at low temperatures and adhesiveness at normal temperature are further improved, with adhesiveness at high temperatures being maintained, and low temperature application properties are markedly improved.

Examples of the metallocene-type propylene/ethylene copolymer (A1) include Vistamaxx (trade name) series manufactured by Exxon Mobil Corporation.

Examples of the metallocene-type ethylene/octene copolymer (A2) include, for example, Affinity GA1900 (trade name), Affinity GA1950 (trade name), Affinity EG8185 (trade name), Affinity EG8200 (trade name), Engage 8137 (trade name), Engage 8180 (trade name), Engage 8400 (trade name) and the like manufactured by The Dow Chemical Company.

Such copolymers (A) may be used alone or in combination of two or more.

<Copolymer (B)>

In the copolymer (B), examples of the "carboxylate esters having ethylenically unsaturated double bonds" specifically include (meth)acrylate esters such as methyl (meth)acrylate, ethyl (meth)acrylate, butyl (meth)acrylate, and 2-ethylhexyl (meth)acrylate; vinyl carboxylates such as vinyl acetate and allyl acetate; allyl esters and the like.

In the present specification, (meth)acrylate ester represents both acrylate ester and methacrylate ester.

In the present invention, the carboxylate esters having ethylenically unsaturated double bonds is preferably methyl (meth)acrylate or ethyl (meth)acrylate, and particularly preferably methyl methacrylate or ethyl acrylate.

Preferred examples of the copolymer (B) include an ethylene/(meth)acrylate ester copolymer, an ethylene/vinyl carboxylate copolymer, and an ethylene/allyl carboxylate copolymer. More preferred copolymers (B) include an ethylene/(meth)acrylate ester copolymer and an ethylene/vinyl carboxylate copolymer, and in particular, an ethylene/vinyl carboxylate copolymer is most desirable.

Specific examples of the ethylene/vinyl carboxylate copolymer include an ethylene/vinyl acetate copolymer (B1) and the like. The copolymer (B) including an ethylene/vinyl acetate copolymer (B1) can more reduce thread formation of the hot-melt adhesive of the present invention.

Specific examples of the ethylene/(meth)acrylate ester copolymer include an ethylene/methyl methacrylate copolymer, an ethylene/ethyl acrylate copolymer, an ethylene/butyl acrylate copolymer, an ethylene/butyl methacrylate copolymer and the like.

The hot-melt adhesive according to the present invention may contain other ethylene-based polymers besides the copolymer (A) and the copolymer (B). Examples of other ethylene polymers include, for example, a copolymer of ethylene and a carboxylic acid having ethylenically unsaturated double bonds, and a copolymer of ethylene and a carboxylic acid anhydride having ethylenically unsaturated double bonds.

The "carboxylic acid having ethylenically unsaturated double bonds" refers to a compound having ethylenically unsaturated double bonds and a carboxyl group, and the type thereof is not particularly limited. Specifically, for example, oleic acid, linoleic acid, maleic acid, itaconic acid, succinic acid, acrylic acid, methacrylic acid and the like may be cited.

Specific examples of the copolymer of ethylene and a carboxylic acid having ethylenically unsaturated double bonds include an ethylene/acrylic acid copolymer, and an ethylene/methacrylic acid copolymer.

The "carboxylic acid anhydride having ethylenically unsaturated double bonds" is a compound having ethylenically unsaturated double bonds and a carboxylic anhydride group in which two carboxyl groups are dehydrated and condensed, and the type thereof is not particularly limited. Specifically, for example, maleic anhydride and the like may be cited.

Specific examples of the copolymer of ethylene and a carboxylic acid anhydride having ethylenically unsaturated double bonds include an ethylene/maleic anhydride copolymer.

<Tackifying Resin (C)>

The tackifying resin (C) is not particularly limited as long as it is one usually used for a hot-melt adhesive and the hot-melt adhesive intended by the present invention can be obtained.

Examples of the tackifying resin include, for example, natural rosins, modified rosins, hydrogenated rosins, glycerol esters of natural rosins, glycerol esters of modified rosins, pentaerythritol esters of natural rosins, pentaerythritol esters of modified rosins, pentaerythritol esters of hydrogenated rosins, copolymers of natural terpenes, three-dimensional polymers of natural terpenes, hydrogenated derivatives of copolymers of hydrogenated terpenes, polyterpene resins, hydrogenated derivatives of phenol-based modified terpene resins, aliphatic petroleum hydrocarbon resins, hydrogenated derivatives of aliphatic petroleum hydrocarbon resins, aromatic petroleum hydrocarbon resins, hydrogenated derivatives of aromatic petroleum hydrocarbon resins, cyclic aliphatic petroleum hydrocarbon resins and hydrogenated derivatives of cyclic aliphatic petroleum hydrocarbon resins. These tackifying resins may be used alone or in combination. For the tackifying resin, liquid type tackifying resins may also be used as long as they are colorless to pale yellow in color tone, have substantially no odor, and have good thermal stability. Considering these properties comprehensively, hydrogenated derivatives of the above resins and the like are preferred as the tackifying resin.

As the tackifying resin, commercial products may be used. Examples of such commercial products include ECR 5600 (trade name) manufactured by Exxon Mobil Corporation, MARUKACLEAR H (trade name) manufactured by Maruzen Petrochemical Co., Ltd., Clearon K100 (trade name) manufactured by YASUHARA CHEMICAL Co., Ltd., ARKON M100 (trade name) manufactured by Arakawa Chemical Industries, Ltd., I MARV S100 (trade name), I MARV Y135 (trade name), I MARV P125 manufactured by Idemitsu Kosan Co., Ltd., Clearon K4090 and Clearon 4100 (trade name) manufactured by YASUHARA CHEMICAL Co., Ltd., ECR231C (trade name), ECR179EX (trade name) manufactured by Exxon Mobil Corporation, T-REZ HC103 (trade name), T-REZ HA103 (trade name), T-REZ HA125 (trade name), T-REZ HB103 (trade name), T-REZ HA085 (trade name) manufactured by JXTG Nippon Oil & Energy Corporation, and REGALITE R7100 (trade name) manufactured by Eastman Chemical Company.

<Wax (D)>

In the present specification, "wax" refers to an organic substance having a weight-average molecular weight of less than 15000 which is solid at normal temperature, becomes liquid when heated, and is generally referred to as "wax". If it has waxy properties, it is not particularly limited as long as the hot-melt adhesive of the present invention can be obtained. The wax may be a synthetic wax or a natural wax.

Examples of the synthetic wax include Fischer-Tropsch waxes, polyolefin waxes (e.g., polyethylene wax, polypropylene wax, polyethylene/polypropylene wax) and the like.

"Fischer Tropsch waxes" refers to those which are synthesized by the Fischer-Tropsch method and generally referred to as Fischer-Tropsch waxes. The Fischer-Tropsch wax is a wax fractionated such that its component molecules have a narrow carbon number distribution from a wax whose component molecules relatively have a wide carbon number distribution.

As Fischer Tropsch wax, SASOL H1 (trade name), SASOL C80 (trade name) from Sasol Wax Company, and FT-115 (trade name) from NIPPON SEIRO CO., LTD. are commercially available.

The natural wax includes paraffin waxes, microcrystalline waxes and petrolatum.

The paraffin waxes are waxes which are solid at room temperature, and separated from vacuum distillation extracted oil. Examples of representative paraffin waxes include Paraffin Wax series manufactured by NIPPON SEIRO CO., LTD.

Microcrystalline waxes are waxes which are solid at room temperature, and separated and produced from a vacuum distillation bottom or heavy extract oil. Examples of representative microcrystalline waxes include Hi-Mic series manufactured by NIPPON SEIRO CO., LTD.

Petrolatum is a wax which is semi-solid at normal temperature, and separated and produced from the vacuum distillation bottom. Representative examples of the petrolatum include Centon CP series manufactured by CHUO YUKA CO., LTD.

These waxes may be used alone, or two or more may be mixed.

In the present invention, the wax (D) preferably has a melting point of 60 to 150° C., particularly preferably 80 to 120° C., and most desirably 90 to 110° C. The thermal resistance and thermal stability of the hot-melt adhesive of the present invention are improved by increasing the melting point of the wax (D), so that excellent adhesive strength is achieved in a high temperature range.

The melting point in the present specification refers to a value measured using differential scanning calorimetry (DSC). Specifically, using a DSC 6220 (trade name) manufactured by SII Nanotechnology Corporation, 10 mg of a sample is weighed in an aluminum container and measured at a temperature increasing rate of 10° C./min. The temperature at the top of the melting peak is referred to as the melting point. Not only the melting point of the wax (D) but also the melting points of the components (A) to (C), other additives, and the hot-melt adhesive are measured by the above method.

<Hot-Melt Adhesive>

In the hot-melt adhesive of the present invention, a metallocene-type propylene/ethylene copolymer (A1) is preferably contained in an amount of 5 to 40 parts by weight, particularly preferably contained in an amount of 10 to 35 parts by weight, and most desirably contained in an amount of 15 to 30 parts by weight, per 100 parts by weight in total of a copolymer (A), a copolymer (B), a tackifying resin (C) and a wax (D).

The blending amount of the metallocene-type propylene/ethylene copolymer (A1) in the above range further improves the thermal resistance and thermal stability of the hot-melt adhesive of the present invention, so that adhesiveness at low temperatures and adhesiveness at normal temperature are improved, with the adhesiveness at high temperatures being maintained, which results in excellent adhesiveness in a wider temperature range.

In the hot-melt adhesive of the present invention, a metallocene-type ethylene/octene copolymer (A2) is preferably contained in an amount of 10 to 40 parts by weight, particularly preferably contained in an amount of 10 to 35 parts by weight, and most desirably contained in an amount of 15 to 30 parts by weight, per 100 parts by weight in total of (A) to (D).

The blending amount of the metallocene-type ethylene/octene copolymer (A2) in the above range further improves adhesiveness at low temperatures and adhesiveness at normal temperature, with adhesiveness at high temperatures being maintained, which also results in marked improvements in low temperature application properties and high-speed setting properties.

In the hot-melt adhesive of the present invention, an ethylene/carboxylate ester copolymer (B) is preferably contained in an amount of 2 to 10 parts by weight, particularly preferably contained in an amount of 2 to 8 parts by weight, and most desirably contained in an amount of 3 to 7 parts by weight, per 100 parts by weight in total of (A) to (D).

In the hot-melt adhesive of the present invention, with (B) in the above range, thread formation at the time of jetting is more reduced.

In the hot-melt adhesive of the present invention, the blending amount of the tackifying resin (C) is preferably 30 to 60 parts by weight, particularly preferably 40 to 60 parts by weight, and most desirably 40 to 50 parts by weight, based on 100 parts by weight in total of (A) to (D).

The blending amount of the tackifying resin (C) in the above range improves initial adhesiveness of the hot-melt adhesive of the present invention, and adhesiveness in a wide temperature range from low temperature to high temperature is maintained.

In the hot-melt adhesive of the present invention, the blending amount of the wax (D) is preferably 5 to 30 parts by weight, particularly preferably 10 to 30 parts by weight, and most desirably 15 to 25 parts by weight, based on 100 parts by weight in total of (A) to (D).

The blending amount of the wax (D) in the above range reduces viscosity of the hot-melt adhesive; improved compatibility between the respective components results in improved thermal resistance and thermal stability. Therefore, adhesiveness at high temperatures is improved, with adhesion at low temperatures being maintained.

The hot-melt adhesive of the present invention may further include other additives. As such additives, for example, a plasticizer, a stabilizer (an ultraviolet absorber, an antioxidant), and a particulate filler may be cited.

The "plasticizer" is blended for the purpose of lowering the melt viscosity of the hot-melt adhesive, imparting flexibility, and improving wettability to the adherend. There is no particular limitation as long as it is compatible with an ethylene-based copolymer, and the hot-melt adhesive intended by the present invention can be obtained. Examples of the plasticizer include paraffinic oils, naphthenic oils and aromatic oils. Particularly preferred are colorless, odorless paraffinic oils.

As the plasticizer (D), commercialized products may be used. Examples thereof include, for example, White Oil Broom 350 (trade name) manufactured by Kukdong Oil & Chemicals Co., Ltd.; Diana Fresia S32 (trade name), Diana Process Oil PW-90 (trade name) and DN Oil KP-68 (trade name) manufactured by IDEMITSU KOSAN CO., LTD.; Enerper M1930 (trade name) manufactured by BP Chemicals, Inc.; Kaydol (trade name) manufactured by Crompton Corporation; and Primol 352 (trade name) manufactured by ESSO. These plasticizers (D) may be used alone or in combination.

The "stabilizer" is blended to prevent molecular weight decrease of the hot-melt adhesive due to heat, air, light and the like, its gelation, coloring, generation of odor and the like, thereby improving the stability of the hot-melt adhesive. It is not particularly limited as long as the hot-melt adhesive intended by the present invention can be obtained. As a stabilizer, for example, an antioxidant and a ultraviolet absorber may be cited.

"UV absorbers" are used to improve light resistance of the hot-melt adhesive. "Antioxidants" are used to prevent oxidative degradation of the hot-melt adhesive. Antioxidants and UV absorbers are generally used in hot melt adhesives, and are not particularly limited as long as the intended paper product described later can be obtained.

As an "antioxidant", for example, a phenol-based antioxidant, a sulfur-based antioxidant, and a phosphorus-based antioxidant may be cited. As a ultraviolet absorber, for example, a benzotriazole-based ultraviolet absorber and a benzophenone-based ultraviolet absorber may be cited. Furthermore, a lactone-based stabilizer may also be added. These may be used alone or in combination.

Commercialized products may be used as stabilizers. Examples thereof include Sumilyzer GM (trade name), Sumilyzer TPD (trade name) and Sumilyzer TPS (trade name) manufactured by Sumitomo Chemical Company, Limited; Irganox 1010 (trade name), Irganox HP2225FF (trade name), Irgafos 168 (trade name) and Irganox 1520 (trade name) manufactured by Ciba Specialty Chemicals Co.; Adekastab AO-60 (trade name) of ADEKA; JF77 (trade name), JP-650 (trade name) manufactured by JOHOKU CHEMICAL CO., LTD. These stabilizers may be used alone or in combination.

The hot-melt adhesive of the present invention may further include a particulate filler. The particulate filler may be one generally used, and is not particularly limited as long as the hot-melt adhesive intended by the present invention can be obtained. Examples of the "fine particle filler" include, for example, mica, calcium carbonate, kaolin, talc, titanium oxide, diatomaceous earth, urea resin, styrene beads, calcined clay, starch and the like. These shapes are preferably spherical, and the dimensions (diameter in the case of spherical) are not particularly limited.

The hot-melt adhesive of the present invention may be prepared, using a generally known method for producing a hot-melt adhesive, by blending a copolymer of ethylene and at least one olefin monomer having 3 to 20 carbon atoms (A), a copolymer of ethylene and carboxylate esters having ethylenically unsaturated double bonds (B), a tackifying resin (C), a wax (D), and, if necessary, the above-mentioned various additives. For example, it may be produced by blending predetermined amounts of the above components, and heating and melting them. The order of adding each component, the heating method, and the like are not particularly limited as long as the intended hot-melt adhesive can be obtained.

<Product with Hot-Melt Adhesive>

The hot-melt adhesive of the present invention is heated and melted, applied to adhesion portions of an adherend, brought into contact with another adherend with it remaining in a melted state as applied. Thereafter, it is cooled and solidified to bond the adherend. Examples of the adherend include, for example, electronic parts, woodwork, building materials, sanitary materials, paper materials and the like. Among them, paper, particularly paperboards are preferred.

A paper product of the present invention comprises adhesion portions on a paper material, that is an adherend, and a hot-melt adhesive which is bonded and solidified at the plurality of adhesion portions. The paper material may be a single member, for example, when assembling a cardboard box. Alternatively, it may be a plurality of members, as in the case of making a craft product.

The type of paper product is not particularly limited, but typically, bookbinding, a calendar, a cardboard packaging container, a carton and the like may be cited. Considering the characteristics of the hot-melt adhesive of the present invention, a paper product composed of paper boards such as cardboard packaging containers and cartons is particularly effective as the paper product of the present invention.

The method of applying the hot-melt adhesive to the adhesion portions is not particularly limited as long as the intended paper product can be obtained, but a hot melt applicator is widely used. As the hot melt applicator, for example, ProBlue P4 Melter (trade name), ProBlue P10 melter (trade name) manufactured by Nordson Corporation and the like may be cited.

The application method is roughly categorized into, for example, contact application and non-contact application. "Contact application" refers to an application method in which a jet machine is brought into contact with a member or film when applying a hot-melt adhesive, whereas "non-contact coating" refers to a method in which a hot-melt adhesive is not brought into contact with a member or film when applying a hot-melt adhesive. As the contact application method, for example, slot coater application, roll coater application and the like may be cited, whereas as the non-contact application method, for example, spiral application which enables applying in a spiral form, omega application and control seam application which enable applying in a wavy form, slot spray application and curtain spray application which enable surface applying, dot application which enables dot-like applying, bead application which enables linear applying, and the like may be cited.

When applying the hot-melt adhesive of the present invention with the hot melt applicator (even when the hot-melt adhesive is discharged in a horizontal direction with respect to the ground with the hot melt applicator to perform applying), a tread-form material of the hot-melt adhesive is hardly discharged. Therefore, areas other than the adhesion portions of the adherend or a peripheral area of a jetting port of the applicator is not smeared with the tread-form material.

The present invention will hereinafter be described using examples and comparative examples for the purpose of describing the present invention in more detail and more specifically. These examples are for the purpose of describing the present invention, and not intended to limit the present invention. The ratios shown in the examples are based on the weight of non-volatile contents unless otherwise stated.

EXAMPLES

Raw materials of the hot-melt adhesive, and formulations, evaluation methods are described below.

(A) Copolymer of Ethylene and at Least One Olefin Monomer Having 3 to 20 Carbon Atoms
- (A1-1) Metallocene-type propylene/ethylene copolymer (ethylene content: 7.1 wt %, melting point: 112° C., melt viscosity at 190° C.: 1850 mPas, Vistamaxx A (prototype) manufactured by Exxon Mobil Corporation)
- (A1-2) Metallocene-type propylene/ethylene copolymer (ethylene content: 6.0 wt %, melting point: 97° C., melt viscosity at 190° C.: 1200 mPas, Vistamaxx 8880 (trade name) manufactured by Exxon Mobil Corporation)
- (A2-1) Metallocene-type ethylene/octene copolymer (1-octene content: 30 to 40% by weight, melting point: 68° C., melt flow rate: 1000 g/10 min, Affinity GA 1900 (trade name) manufactured by The Dow Chemical Company)
- (A2-2) Metallocene-type ethylene/octene copolymer (1-octene content: 35 to 37 wt %, melting point: 70° C., melt flow rate: 500 g/10 min, Affinity GA 1950 (trade name) manufactured by The Dow Chemical Company)
- (A2-3) Metallocene-type ethylene/octene copolymer (1-octene content: 30 to 40% by weight, melting point: 70° C., melt flow rate: 1250 g/10 min, Affinity GA 1875 (trade name) manufactured by The Dow Chemical Company)
- (A2-4) Metallocene-type ethylene/octene copolymer (1-octene content: 30 to 40 wt %, melting point: 68° C., melt flow rate: 660 g/10 min, Affinity GA 1000R (trade name) manufactured by The Dow Chemical Company)
- (A3) Metallocene-type ethylene/hexene copolymer (melting point: 95° C., Nipolon Z HM510R (trade name) manufactured by Tosoh Corporation)

(B) Copolymer of Ethylene and Carboxylate Esters Having Ethylenic Double Bonds
- (B1-1) Ethylene/vinyl acetate copolymer (vinyl acetate content: 20 wt %, melt flow rate: 20 g/10 min, ULTRASEN 633 (trade name) manufactured by TOSOH CORPORATION)
- (B1-2) Ethylene/vinyl acetate copolymer (vinyl acetate content 28 wt %, melt flow rate 18 g/10 min, ULTRASEN 710 (trade name) manufactured by TOSOH CORPORATION)
- (B2) Ethylene/methyl methacrylate copolymer (methyl methacrylate content 32 wt %, melt flow rate 450 g/10 min, Acryft CM5022 (trade name) manufactured by Sumitomo Chemical Company, Limited)
- (B3) Ethylene/ethyl acrylate copolymer (ethyl acrylate content 25 wt %, melt flow rate 250 g/10 min, NUC-6070 (trade name) manufactured by The Dow Chemical Company)

(C) Tackifying Resin
- (C1) Hydrogenated alicyclic/aromatic copolymer hydrocarbon resin (softening point: 103° C., T-REZ HC103 (trade name) manufactured by JXTG Energy Corporation)
- (C2) Hydrogenated alicyclic hydrocarbon resin (softening point: 103° C., T-REZ HA103 (trade name) manufactured by JXTG Energy Corporation)
- (C3) Hydrogenated alicyclic hydrocarbon resin (softening point: 125° C., T-REZ HA125 (trade name) manufactured by JXTG Energy Corporation)

(D) Wax
  (D1) Fischer-Tropsch wax (melting point: 108° C., penetration 2, SAZOL WAX H1 (trade name) manufactured by Sasol Co.)
  (D2) Fischer-Tropsch wax (melting point: 80° C., penetration 7, SASOL WAX C80 (trade name) manufactured by Sasol Co.)
  (D3) Paraffin wax (melting point: 69° C., penetration 12, Paraffin 155F (trade name) manufactured by NIPPON SEIRO CO., LTD.)
  (D4) Microcrystalline wax (melting point: 84° C., penetration 12, Himic 1080 (trade name) manufactured by NIPPON SEIRO CO., LTD.)
  (D5) Polyethylene wax (melting point: 109° C., penetration 7, High Wax 320P (trade name) manufactured by Mitsui Chemicals, Inc.)
  (D6) Polypropylene wax (melting point: 140/148° C., penetration 1 or less, High Wax NP 105 (trade name) manufactured by Mitsui Chemicals, Inc.)
(E) Antioxidants
  (E1) Phenol-based antioxidant (Adekastab AO60 (trade name) manufactured by ADEKA CORPORATION)
  (E2) Phosphorus-based antioxidant (JP650 (trade name) manufactured by JOHOKU CHEMICAL CO., LTD.)
  (E3) Sulfur-based antioxidant (Sumilyzer TPS (trade name) manufactured by Sumitomo Chemical Company, Limited)

These components were melted and mixed in the ratios (parts by weight) shown in Tables 1 and 3. The respective components were melted and mixed at about 150° C. for about one hour using a universal stirrer to produce hot melt adhesives of Examples 1 to 11 and Comparative Examples 1 to 4. Respective performances of hot-melt adhesives of the Examples and the Comparative Examples were evaluated by the following methods. The evaluation results are shown in Tables 2 and 4.

<Low Temperature Application Properties>

Melt viscosities at 150° C. of the hot-melt adhesives were measured using a Brookfield viscometer (No. 27 rotor) and a thermocell to evaluate the low-temperature application properties. Evaluation criteria are as follows.
  ⊚: melt viscosity at 150° C. is 500 mPas or more and less than 2000 mPas
  ○: melt viscosity at 150° C. is 2000 mPas or more and less than 3000 mPas
  x: melt viscosity at 150° C. is 3000 mPas or more <Adhesiveness>

A hot-melt adhesive melted at 150° C. was applied to a K liner cardboard, which was laminated to a K-liner cardboard under the conditions of an application amount of 2 g/m, a setting time of 10 seconds, an open time of 3 seconds, and a pressing pressure of 1 kg/25 cm².
(Evaluation Method)
The prepared sample was aged for 24 hours in a constant temperature chamber set at 60° C., 23° C., or −10° C., and then forcibly peeled off by hand under the atmosphere. The rate of breakage of the K-liner cardboard of the total bonded area was taken as a material breakage rate (rate of material broken), and the appearance was evaluated. Evaluation criteria are as follows.
  ⊚: Material breakage rate is higher than 80%
  ○: Material breakage rate is 60% to 80%
  Δ: Material breakage rate is 40% or more and less than 60%
  x: Material breakage rate less than 40%

<Thermal Stability>
(Sample Preparation)
20 g of a hot-melt adhesive was put in a 70 cc glass bottle and stored for 72 hours in a 150° C. constant temperature chamber. 1) Viscosity increase-decrease rate, and 2) formation of carbide were confirmed. Evaluation criteria are as follows.
(Evaluation Method)
1) Viscosity Change Rate
The viscosity increase-decrease rate is an increased or decreased ratio of the viscosity at 150° C. of the hot-melt adhesive after one week to the initial viscosity at 150° C. of the hot-melt adhesive.
Specifically, it was calculated by the following formula.

Viscosity increase-decrease rate (%)=(melt viscosity after storage for 1 week at 150° C.)×100/(initial viscosity at 150° C.)−100

⊚: Viscosity increase-decrease rate is less than 5%
  ○: Viscosity increase-decrease rate is 5%-10%
  Δ: Viscosity increase-decrease rate is more than 10% and less than 20%
  x: Viscosity increase-decrease rate is 20% or more
2) Formation of Carbide
  ⊚: No carbide
  ○: Slight carbide formation
  Δ: Carbide formation
  x: Considerable carbide formation <High-Speed Setting Properties>
(Sample Preparation)
A hot-melt adhesive melted at 150° C. was applied to a K-liner cardboard, which was laminated to a K-liner cardboard under the conditions of an application amount of 2 g/m, an open time of 3 seconds, and a pressing pressure of 1 kg/25 cm².
(Evaluation Method)
The prepared sample was forcibly peeled off at a constant speed in a vertical direction, and the time (solidification speed) until the peeling strength was 6 kgf or more, and the K-liner cardboard was broken (solidification speed) was taken as a setting time, and the time was measured. Evaluation criteria are as follows.
  ⊚: Set time is less than 0.5 seconds
  ○: Set time is 0.5 seconds or more and less than 0.7 seconds
  x: Set time is 0.7 seconds or more <Thermal Resistance>
(Sample Preparation)
A hot-melt adhesive melted at 150° C. was applied to a K liner cardboard, which was laminated to a K-liner cardboard under the conditions of an application amount of 2 g/m, a setting time of 10 seconds, an open time of 3 seconds, and a pressing pressure of 1 kg/25 cm².
(Evaluation Method)
The prepared sample was subjected to a load of 300 g/25 cm² in a stress direction under a 60° C. atmosphere, and the time until the laminated sample was peeled off was measured. Evaluation criteria are as follows.
  ⊚: Peel-off time is longer than 8 hours
  ○: Peel-off time is 3 hours to less than 8 hours
  x: Peel-off time is less than 3 hours <Thread Forming Properties>
A hot-melt adhesive was vertically coated intermittently to an adherend at a distance of 20 cm from a tip of a hot melt gun. The state of fallen materials between the hot melt gun and the adherend were visually observed to evaluate thread forming properties. Measurement conditions and evaluation criteria are as follows.

(Measurement Conditions)

Temperature setting: A tank, a hose, and a nozzle are all at 150° C.
Nozzle diameter: 14/1000 inches
Nozzle: 4 orifices (number of discharge ports: 4)
Discharge pressure: 0.3 MPa
Number of discharged shots: 4 orifices are 180 shots/1 minute:

⊚: The shape of fallen materials is granular.
○: The shape of fallen materials is almost granular, but tread-form materials are slightly mixed.
Δ: The shape of fallen materials is a mixture of granular and tread-form materials.
x: The shape of fallen materials is tread-form.

TABLE 1

| | Component | Example 1 | 2 | 3 | 4 | 5 | 6 | 7 | 8 |
|---|---|---|---|---|---|---|---|---|---|
| A | Copolymer of ethylene and at least one olefin monomer having 3 to 20 carbon atoms copolymer having 3 to 20 carbon atoms | | | | | | | | |
| A1-1 | Metallocene-type propylene/ethylene copolymer "Vistamaxx A" | 15 | | 15 | 13 | 15 | 10 | 14 | 14 |
| A1-2 | Metallocene-type propylene/ethylene copolymer "Vistamaxx 88880" | | 17 | | | 15 | | | |
| A2-1 | Metallocene-type ethylene/octene copolymer "Affinity GA 1900" | 16 | | | | | | 16 | 16 |
| A2-2 | Metallocene-type ethylene/octene copolymer "Affinity GA 1950" | | 16 | | | 15 | | | |
| A2-3 | Metallocene-type ethylene/octene copolymer "Affinity GA 1875" | | | 17 | | 15 | | | |
| A2-4 | Metallocene-type ethylene/octene copolymer "Affinity GA 1000R" | | | | 16 | | | | |
| A3 | Metallocene-type ethylene/hexene copolymer "Nipolon Z HM510R" | | | | | | 5 | | |
| B | Ethylene/carboxylate esters | | | | | | | | |
| B1-1 | Ethylene/vinyl acetate copolymer "ULTRASEN 633" | 5 | | 4 | 5 | 3 | 3 | 4 | |
| B1-2 | Ethylene/vinyl acetate copolymer "ULTRASEN 710" | | 3 | | | | | | 2 |
| B2 | Ethylene/methyl methacrylate copolymer "Acryft CM5022" | | | | | | | 2 | |
| B3 | Ethylene/ethyl acrylate copolymer "NUC-6070" | | | | | | | | 5 |
| C | Tackifying resin | | | | | | | | |
| C1 | Hydrogenated alicyclic/aromatic copolymer hydrocarbon resin "T-REZ HC103" | 26 | 26 | 26 | 26 | 26 | 14 | 26 | 25 |
| C2 | Hydrogenated alicyclic hydrocarbon resin "T-REZ HA103" | 18 | | | 20 | 18 | | 18 | |
| C3 | Hydrogenated alicyclic hydrocarbon resin "T-REZ HA125" | | 18 | 18 | | | 20 | | 18 |
| D | Wax | | | | | | | | |
| D1 | Fischer Tropsch wax "SASOL H1" | 20 | 20 | 20 | 15 | 13 | 23 | 20 | 20 |
| D2 | Fischer Tropsch wax "SASOL C80" | | | | 5 | | | | |
| D3 | Paraffin wax "Paraffin 155F" | | | | | 5 | | | |
| D4 | Microcrystalline wax "Himic 1080" | | | | | | | | |
| D5 | Polyethylene wax "Hiwax 320 P" | | | | | | | | |
| D6 | Polypropylene wax "Hiwax NP105" | | | | | | | | |
| | Total of A-D | 100 | 100 | 100 | 100 | 100 | 100 | 100 | 100 |
| E | Antioxidant | | | | | | | | |
| E1 | Phenol-based "Adekastab AO60" | 0.3 | 0.3 | 0.3 | 0.3 | 0.3 | 0.3 | 0.3 | 0.3 |
| E2 | Phosphorus-based "JP650" | 0.3 | 0.3 | 0.3 | 0.3 | 0.3 | 0.3 | 0.3 | 0.3 |
| E3 | Sulfur-based "Sumilyzer TPS" | 0.3 | 0.3 | 0.3 | 0.3 | 0.3 | 0.3 | 0.3 | 0.3 |

TABLE 2

| Performance test results | | Example 1 | 2 | 3 | 4 | 5 | 6 | 7 | 8 |
|---|---|---|---|---|---|---|---|---|---|
| Low temperature application properties | Applying at 150° C. | ⊚ | ⊚ | ⊚ | ⊚ | ○ | ⊚ | ⊚ | ⊚ |
| Adhesiveness | 60° C. | ⊚ | ○ | ⊚ | ⊚ | ⊚ | ○ | ⊚ | ⊚ |
| | 23° C. | ⊚ | ⊚ | ⊚ | ⊚ | ○ | ⊚ | ⊚ | ⊚ |
| | −10° C. | ⊚ | ⊚ | ⊚ | ⊚ | ○ | ⊚ | ⊚ | ⊚ |
| Thermal stability | Carbide | ⊚ | ⊚ | ⊚ | ○ | ○ | ⊚ | ○ | ○ |
| | Viscosity increase-decrease rate | ⊚ | ⊚ | ⊚ | ○ | ⊚ | ⊚ | ⊚ | ⊚ |
| High-speed setting properties | 23° C. | ⊚ | ⊚ | ⊚ | ⊚ | ○ | ⊚ | ⊚ | ⊚ |

TABLE 2-continued

| Performance test results | | Example | | | | | | | |
|---|---|---|---|---|---|---|---|---|---|
| | | 1 | 2 | 3 | 4 | 5 | 6 | 7 | 8 |
| Thermal resistance | 60° C. | ◎ | ○ | ◎ | ◎ | ◎ | ○ | ◎ | ◎ |
| Thread forming properties | | ◎ | ◎ | ◎ | ◎ | ○ | ◎ | ◎ | ○ |

TABLE 3

| | Component | Examples | | | Comparative Examples | | | |
|---|---|---|---|---|---|---|---|---|
| | | 9 | 10 | 11 | 1 | 2 | 3 | 4 |
| A | Copolymer of ethylene and at least one olefin monomer having 3 to 20 carbon atoms copolymer having 3 to 20 carbon atoms | | | | | | | |
| A1-1 | Metallocene-type propylene/ethylene copolymer "Vistamaxx A" | 35 | 10 | 20 | | 20 | 20 | 20 |
| A1-2 | Metallocene-type propylene/ethylene copolymer "Vistamaxx 88880" | | 10 | | | | | |
| A2-1 | Metallocene-type ethylene/octene copolymer "Affinity GA 1900" | | | | | 15 | 55 | 35 |
| A2-2 | Metallocene-type ethylene/octene copolymer "Affinity GA 1950" | 8 | | | | | | |
| A2-3 | Metallocene-type ethylene/octene copolymer "Affinity GA 1875" | | 15 | 20 | 40 | | | |
| A2-4 | Metallocene-type ethylene/octene copolymer "Affinity GA 1000R" | | | | | | | |
| A3 | Metallocene-type ethylene/hexene copolymer "Nipolon Z HM510R" | | | | | | | |
| B | Ethylene/carboxylate esters | | | | | | | |
| B1-1 | Ethylene/vinyl acetate copolymer "ULTRASEN 633" | 3 | 5 | | | | 5 | 5 |
| B1-2 | Ethylene/vinyl acetate copolymer "ULTRASEN 710" | | | 3 | 3 | | | |
| B2 | Ethylene/methyl methacrylate copolymer "Acryft CM5022" | | | | | | | |
| B3 | Ethylene/ethyl acrylate copolymer "NUC-6070" | | | | | | | |
| C | Tackifying resin | | | | | | | |
| C1 | Hydrogenated alicyclic/aromatic copolymer hydrocarbon resin "T-REZ HC103" | 15 | 25 | 22 | 20 | 25 | | 20 |
| C2 | Hydrogenated alicyclic hydrocarbon resin "T-REZ HA103" | 23 | 20 | 18 | 22 | | | 20 |
| C3 | Hydrogenated alicyclic hydrocarbon resin "T-REZ HA125" | | | | | 20 | | |
| D | Wax | | | | | | | |
| D1 | Fischer Tropsch wax "SASOL H1" | 12 | 10 | | 15 | 20 | 10 | |
| D2 | Fischer Tropsch wax "SASOL C80" | | | 12 | | | | |
| D3 | Paraffin wax "Paraffin 155F" | | | | | | 10 | |
| D4 | Microcrystalline wax "Himic 1080" | 5 | | | | | | |
| D5 | Polyethylene wax "Hiwax 320 P" | | 5 | | | | | |
| D6 | Polypropylene wax "Hiwax NP105" | | | 5 | | | | |
| | Total of A-D | 101 | 100 | 100 | 100 | 100 | 100 | 100 |
| E | Antioxidant | | | | | | | |
| E1 | Phenol-based "Adekastab AO60" | 0.3 | 0.3 | 0.3 | 0.3 | 0.3 | 0.3 | 0.3 |
| E2 | Phosphorus-based "JP650" | 0.3 | 0.3 | 0.3 | 0.3 | 0.3 | 0.3 | 0.3 |
| E3 | Sulfur-based "Sumilyzer TPS" | 0.3 | 0.3 | 0.3 | 0.3 | 0.3 | 0.3 | 0.3 |

TABLE 4

| Performance test results | | Example | | | Comparative Example | | | |
|---|---|---|---|---|---|---|---|---|
| | | 9 | 10 | 11 | 1 | 2 | 3 | 4 |
| Low temperature application properties | Applying at 150° C. | ◎ | ◎ | ○ | ◎ | ◎ | X | X |
| Adhesiveness | 60° C. | ◎ | ◎ | ◎ | X | ○ | X | X |
| | 23° C. | ◎ | ◎ | ◎ | ◎ | ◎ | X | X |
| | −10° C. | ○ | ◎ | ◎ | ◎ | Δ | X | X |
| Thermal stability | Carbide | ◎ | ○ | ◎ | ◎ | ◎ | X | X |
| | Viscosity increase-decrease rate | ○ | ○ | ◎ | ◎ | ◎ | X | X |

TABLE 4-continued

|  |  | Example | | | Comparative Example | | | |
|---|---|---|---|---|---|---|---|---|
| Performance test results |  | 9 | 10 | 11 | 1 | 2 | 3 | 4 |
| High-speed setting properties | 23° C. | ○ | ○ | ◎ | ○ | ○ | X | X |
| Thermal resistance | 60° C. | ◎ | ◎ | ◎ | X | ○ | X | X |
| Thread forming properties |  | ◎ | ◎ | ◎ | ◎ | X | X | X |

As shown in Table 2 and Table 4, the hot-melt adhesives of Examples 1 to 11 have reduced thread formation, excellent low-temperature application properties, and high-speed setting properties. They also have excellent thermal resistance and thermal stability. The adhesiveness of the hot-melt adhesives of the examples is excellent over a wide temperature range (−10 to 60° C.), and in particular, the adhesiveness at 60° C. is high. Therefore, when packing a package with a packaging material such as cardboard, if the packaging material is sealed with the hot-melt adhesives of the examples, packing may proceed without worrying about the heat of packages.

On the other hand, the hot-melt adhesives of Comparative Examples 1 to 4 are significantly inferior in any one of the thread forming properties, low-temperature application properties, high-speed setting properties, thermal resistance, thermal stability and adhesiveness.

Since the hot-melt adhesive of Comparative Example 1 does not contain the component (A1), thermal resistance is low and adhesiveness at high temperatures is low.

Since the hot-melt adhesive of Comparative Example 2 does not contain the copolymer (B), thread forming properties are significantly poor.

The hot-melt adhesive of Comparative Example 3 does not contain the tackifying resin (C), and the hot-melt adhesive of Comparative Example 4 does not contain the wax (D). The hot-melt adhesives of Comparative Examples 3 and 4 are inferior in all performances, and do not function as hot-melt adhesives.

INDUSTRIAL APPLICABILITY

The present invention provides a hot-melt adhesive. The hot melt-adhesive of the present invention may be used in paper processing fields in general, and is suitable for use in sealing packaging materials (in particular, cardboard) and the like.

The invention claimed is:

1. A hot-melt adhesive comprising:
  a copolymer (A) comprising a mixture of a propylene/ethylene copolymer that is prepared with a metallocene catalyst (A1), an ethylene/octene copolymer that is prepared with a metallocene catalyst (A2), and a metallocene-type ethylene/hexene copolymer (A3);
  a copolymer of ethylene and carboxylate esters having ethylenically unsaturated double bonds (B) comprising an ethylene/vinyl acetate copolymer (B1);
  a tackifying resin (C); and
  a wax (D), wherein:
  the propylene/ethylene copolymer (A1) is present in an amount of from 5 to 40 parts by weight, based on 100 parts by total weight of the hot-melt adhesive,
  the ethylene/octene copolymer (A2) is present in an amount of from 10 to 40 parts by weight, based on 100 parts by total weight of the hot-melt adhesive, and
  the hot-melt adhesive has a viscosity of from 500-3000 mPas at 150° C., measured with Brookfield Viscometer, spindle 27.

2. The hot-melt adhesive of claim 1, wherein the hot-melt adhesive has a viscosity of from 500-2000 mPas at 150° C., measured with Brookfield Viscometer, spindle 27.

3. A paper product comprising the hot-melt adhesive of claim 1.

4. The hot-melt adhesive of claim 1, further comprising an additive selected from the group consisting of a plasticizer, a stabilizer, a filler, and any mixture thereof.

5. The hot-melt adhesive of claim 1, wherein the wax (D) has a melting point of from 90 to 110° C.

6. The hot-melt adhesive of claim 1, wherein the propylene/ethylene copolymer (A1) has a melting point of from 90 to 110° C.

7. The hot-melt adhesive of claim 1, wherein the tackifying resin (C) is present in an amount of from 40 to 60 parts by weight, based on 100 parts by total weight of the hot-melt adhesive.

8. A hot-melt adhesive comprising:
  a copolymer (A) comprising a mixture of a propylene/ethylene copolymer that is prepared with a metallocene catalyst (A1), an ethylene/octene copolymer that is prepared with a metallocene catalyst (A2), and a metallocene-type ethylene/hexene copolymer (A3);
  a copolymer of ethylene and carboxylate esters having ethylenically unsaturated double bonds (B) comprising an ethylene/vinyl acetate copolymer (B1);
  a tackifying resin (C); and
  a wax (D), wherein:
  the propylene/ethylene copolymer (A1) is present in an amount of from 10 to 20 parts by weight, based on 100 parts by total weight of the hot-melt adhesive,
  the ethylene/octene copolymer (A2) is present in an amount of from 10 to 20 parts by weight, based on 100 parts by total weight of the hot-melt adhesive,
  the metallocene-type ethylene/hexene copolymer (A3) is present in an amount of 5 parts by weight, based on 100 parts by total weight of the hot-melt adhesive, and
  the hot-melt adhesive has a viscosity of from 500-3000 mPas at 150° C., measured with Brookfield Viscometer, spindle 27.

9. The hot-melt adhesive of claim 8, wherein the hot-melt adhesive has a viscosity of from 500-2000 mPas at 150° C., measured with Brookfield Viscometer, spindle 27.

10. A paper product comprising the hot-melt adhesive of claim 8.

11. The hot-melt adhesive of claim 8, further comprising an additive selected from the group consisting of a plasticizer, a stabilizer, a filler, and any mixture thereof.

12. The hot-melt adhesive of claim 8, wherein the wax (D) has a melting point of from 90 to 110° C.

13. The hot-melt adhesive of claim 8, wherein the propylene/ethylene copolymer (A1) has a melting point of from 90 to 110° C.

14. The hot-melt adhesive of claim 8, wherein the tackifying resin (C) is present in an amount of from 40 to 60 parts by weight, based on 100 parts by total weight of the hot-melt adhesive.

* * * * *